United States Patent
Stamenkovic et al.

(10) Patent No.: US 10,637,072 B2
(45) Date of Patent: Apr. 28, 2020

(54) SYSTEMS AND METHODS FOR PTNI NANOCAGES

(71) Applicant: UCHICAGO ARGONNE, LLC, Chicago, IL (US)

(72) Inventors: Vojislav Stamenkovic, Naperville, IL (US); Gregory K. Krumdick, Homer Glen, IL (US); Rongyue Wang, Naperville, IL (US); Nenad Markovic, Hinsdale, IL (US); Krzysztof Pupek, Plainfield, IL (US); Trevor L. Dzwiniel, Carol Stream, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 16/006,671

(22) Filed: Jun. 12, 2018

(65) Prior Publication Data
US 2019/0379059 A1    Dec. 12, 2019

(51) Int. Cl.
| | | |
|---|---|---|
| *H01M 4/92* | (2006.01) | |
| *H01M 4/90* | (2006.01) | |
| *B82Y 30/00* | (2011.01) | |
| *B82Y 40/00* | (2011.01) | |

(52) U.S. Cl.
CPC ......... *H01M 4/921* (2013.01); *H01M 4/9091* (2013.01); *B82Y 30/00* (2013.01); *B82Y 40/00* (2013.01)

(58) Field of Classification Search
CPC ..... H01M 4/921; H01M 4/9091; B82Y 30/00; B82Y 40/00
See application file for complete search history.

(56) References Cited

U.S. PATENT DOCUMENTS

| | | |
|---|---|---|
| 5,879,827 A | 3/1999 | Debe et al. |
| 7,252,698 B2 | 8/2007 | Mirkin et al. |
| 7,622,217 B2 | 11/2009 | Debe et al. |
| 7,871,738 B2 | 1/2011 | Stamenkovic et al. |
| 8,178,463 B2 | 5/2012 | Stamenkovic et al. |
| 8,685,878 B2 | 4/2014 | Stamenkovic et al. |
| 9,246,177 B2 | 1/2016 | Stamenkovic et al. |
| 2004/0072061 A1 | 4/2004 | Nakano et al. |
| 2006/0083970 A1 | 4/2006 | Shibutani et al. |
| 2009/0247400 A1 | 10/2009 | Stamenkovic et al. |
| 2010/0008840 A1 | 1/2010 | Zhong et al. |
| 2010/0086832 A1 | 4/2010 | Lopez et al. |
| 2010/0092841 A1 | 4/2010 | Lopez et al. |
| 2010/0197490 A1 | 8/2010 | Adzic et al. |

(Continued)

FOREIGN PATENT DOCUMENTS

WO    WO-2011/139705 A1    11/2011

OTHER PUBLICATIONS

Stamenkovic et al (Effect of Surface Composition on Electronic Structure, Stability, and Electrocatalytic Properties of Pt-Transition Metal Alloys: Pt-Skin vs Pt-Skeleton Surfaces, J. Am. Chem. Soc. 2006, 128, 27, 8813-8819). (Year: 2006).*

(Continued)

*Primary Examiner* — Melvin C. Mayes
*Assistant Examiner* — Michael Forrest
(74) *Attorney, Agent, or Firm* — Foley & Lardner LLP

(57) ABSTRACT

A method for synthesis of PtNi nanocages by synthesizing PtNi6 nanoparticles and acid leaching to form PtNi nanocages. The acid leaching removes nickel selectively from the core of the nanoparticle.

20 Claims, 7 Drawing Sheets

(56) References Cited

U.S. PATENT DOCUMENTS

| | | | |
|---|---|---|---|
| 2011/0077147 | A1 | 3/2011 | Stamenkovic et al. |
| 2011/0159365 | A1 | 6/2011 | Loveness et al. |
| 2011/0189589 | A1 | 8/2011 | Erlebacher et al. |
| 2013/0053239 | A1 | 2/2013 | Carpenter |
| 2013/0085061 | A1* | 4/2013 | Stamenkovic ........ H01M 4/921 502/185 |
| 2013/0133483 | A1 | 5/2013 | Yang et al. |
| 2013/0178357 | A1 | 7/2013 | Adzic et al. |
| 2015/0132683 | A1 | 5/2015 | Shirvanian |
| 2015/0236355 | A1* | 8/2015 | Yang .................... H01M 4/921 429/405 |
| 2016/0233516 | A1 | 8/2016 | Nakamura et al. |
| 2018/0281060 | A1 | 10/2018 | Yang et al. |

OTHER PUBLICATIONS

"A matter of scale," Nature Nanotechnology 11, p. 773 (2016).
Banham & Ye, "Current Status and Future Development of Catalyst Materials and Catalyst Layers for Proton Exchange Membrane Fuel Cells: An Industrial Perspective," ACS Energy Letters 2(3), pp. 629-638 (2017).
Chen, et al., "Highly Crystalline Multimetallic Nanoframes with Three-Dimensional Electrocatalytic Surfaces," Science 343(6177), pp. 1339-1343 (2014).
Choi, et al., "Gram-scale synthesis of highly active and durable octahedral PtNi nanoparticle catalysts for proton exchange membrane fuel cell," Applied Catalysis B: Environmental 225, pp. 530-537 (2018).
Cui, et al., "Compositional segregation in shaped Pt alloy nanoparticles and their structural behavior during electrocatalysis," Nature Materials 12, pp. 765-771 (2013).
Debe, "Electrocatalyst approaches and challenges for automotive fuel cells," Nature 486, pp. 43-51 (2012).
Dubau, et al., "Tuning the Performance and the Stability of Porous Hollow PtNi/C Nanostructures for the Oxygen Reduction Reaction," ACS Catalysis 5(9), pp. 5333-5341 (2015).
Fu, et al., "Three-dimensional PtNi hollow nanochains as an enhanced electrocatalyst for the oxygen reduction reaction," Journal of Materials Chemistry A 4, pp. 8755-8761 (2016).
Gasteiger, et al., "Activity benchmarks and requirements for Pt, Pt-alloy, and non-Pt oxygen reduction catalysts for PEMFCs," Applied Catalysis B: Environmental 56(1-2), pp. 9-35 (2005).
Han, et al., "Record activity and stability of dealloyed bimetallic catalysts for proton exchange membrane fuel cells," Energy & Environmental Science 8, pp. 258-266 (2015).
Koh & Strasser, "Electrocatalysis on Bimetallic Surfaces: Modifying Catalytic Reactivity for Oxygen Reduction by Voltammetric Surface Dealloying," Journal of the American Chemical Society 129(42), pp. 12624-12625 (2007).
Li, et al., "Surfactant Removal for Colloidal Nanoparticles from Solution Synthesis: The Effect on Catalytic Performance," ACS Catalysis 2(7), pp. 1358-1362 (2012).
Lohse, et al., "A Simple Millifluidic Benchtop Reactor System for the High-Throughput Synthesis and Functionalization of Gold Nanoparticles with Different Sizes and Shapes," ACS Nano 7(5), pp. 4135-4150 (2013).
Lopes, et al., "Relationships between Atomic Level Surface Structure and Stability/Activity of Platinum Surface Atoms in Aqueous Environments," ACS Catalysis, 2016, 6(4), pp. 2536-2544.
Niu & Li, "Removal and Utilization of Capping Agents in Nanocatalysis," Chemistry of Materials 26(1), pp. 72-83 (2014).
Niu, et al., "Toward continuous and scalable production of colloidal nanocrystals by switching from batch to droplet reactors," Chemical Society Reviews 44, pp. 5806-5820 (2015).
Shao, et al., "Recent Advances in Electrocatalysts for Oxygen Reduction Reaction," Chemical Reviews 116(6), pp. 3594-3657 (2016).
Snyder, et al., "Structure/Processing/Properties Relationships in Nanoporous Nanoparticles As Applied to Catalysis of the Cathodic Oxygen Reduction Reaction," Journal of the American Chemical Society 134(20), pp. 8633-8645 (2012).
Stamenkovic, et al., "Improved Oxygen Reduction Activity on Pt3Ni(111) via Increased Surface Site Availability," Science 315(511), pp. 493-497 (2007).
Stamenkovic, et al., "Improved Oxygen Reduction Activity on Pt3Ni(111) via Increased Surface Site Availability," Science 315(5811), pp. 493-497 (2007).
Stephens, et al., "Toward sustainable fuel cells," Science 354(6318), pp. 1378-1379 (2016).
Strasser, "Catalysts by Platonic design," Science 349(6246), pp. 379-380 (2015).
Sun & Xia, "Shape-Controlled Synthesis of Gold and Silver Nanoparticles," Science 298(5601), pp. 2176-2179 (2002).
Sun, et al., "Template-Engaged Replacement Reaction: A One-Step Approach to the Large-Scale Synthesis of Metal Nanostructures with Hollow Interiors," Nano Letters 2(5), pp. 481-485 (2002).
Tsao & Yang, "Continuous Production of Carbon-Supported Cubic and Octahedral Platinum-Based Catalysts Using Conveyor Transport System," Small 12(35), pp. 4808-4814 (2016).
Wang, et al., "Design and Synthesis of Bimetallic Electrocatalyst with Multilayered Pt-Skin Surfaces," Journal of the American Chemical Society 133(36), pp. 14396-14403 (2011).
Xia, et al., "Shape-Controlled Synthesis of Metal Nanocrystals: Simple Chemistry Meets Complex Physics," Angewandte Chemie 48(1), pp. 60-103 (2008).
Zhang & Xia, "Scaling up the Production of Colloidal Nanocrystals: Should We Increase or Decrease the Reaction Volume?," Advanced Materials 26(16), pp. 2600-2606 (2014).
Zhang, et al., "A Generic Wet Impregnation Method for Preparing Substrate-Supported Platinum Group Metal and Alloy Nanoparticles with Controlled Particle Morphology," Nano Letters 16(1), pp. 164-169 (2016).
Zhang, et al., "Platinum-based nanocages with subnanometer-thick walls and well-defined, controllable facets," Science 349(6246), pp. 412-416 (2016).
Zhang, et al., "Solid-State Chemistry-Enabled Scalable Production of Octahedral Pt-Ni Alloy Electrocatalyst for Oxygen Reduction Reaction," Journal of the American Chemical Society 136(22), pp. 7805-7808 (2014).
Ahrenstorf, et al., "Colloidal Synthesis of NixPt1-x Nanoparticles with Tuneable Composition and Size," Small 3(2), pp. 271-274 (2007).
Armstrong, et al., "Evaluating the performance of nanostructured materials as lithium-ion battery electrodes," Nano Research 7(1), pp. 1-62 (2014).
Baskes & Johnson, "Modified embedded atom potentials for HCP metals," Modelling and Simulation in Materials Science and Engineering 2, pp. 147-163 (1994).
Baskes, "Modified embedded-atom potentials for cubic materials and impurities," Physical Review B 46(5), pp. 2727-2742 (1992).
Carey, "Dichlorobenzene," Encyclopaedia Britannica, retrieved from https://www.britannica.com/science/dichlorobenzene, 1 page (2008).
Cargnello, et al., "Control of Metal Nanocrystal Size Reveals Metal-Support Interface Role for Ceria Catalysts," Science 341(6147), pp. 771-773 (2013).
Chadi & Cohen, "Special Points in the Brillouin Zone," Physical Review 8(12), pp. 5747-5753 (1973).
Dahmani, et al., "Ni-Pt Phase Diagram: Experiment and Theory," Physical Review Letters 55(11), pp. 1208-1211 (1985).
Davis, "Ordered porous materials for emerging applications," Nature 417, pp. 813-821 (2002).
Erlebacher, et al., "Evolution of nanoporosity in dealloying," Nature 410, pp. 450-453 (2001).
Ferreira, et al., "Instability of Pt?/?C Electrocatalysts in Proton Exchange Membrane Fuel Cells: A Mechanistic Investigation," Journal of the Electrochemical Society 152(11), pp. A2256-A2271 (2005).
Grass, et al., "New ambient pressure photoemission endstation at Advanced Light Source beamline 9.3.2," Review of Scientific Instruments 81, 053106, 7 pages (2010).

(56) References Cited

OTHER PUBLICATIONS

Hammer, et al., "Improved adsorption energetics within density-functional theory using revised Perdew-Burke-Ernzerhof functionals," Physical Review B 59(11), pp. 7413-7421 (1999).
Jaco & Goddard, "Adsorption of Atomic H and O on the (111) Surface of Pt3Ni Alloys," The Journal of Physical Chemistry B 108(24), pp. 8311-8323 (2004).
Johnson, et al., "Ordered Mesoporous Polymers of Tunable Pore Size from Colloidal Silica Templates," Science 283(5404), pp. 963-965 (1999).
Kang, et al., "Heterogeneous Catalysts Need Not Be so 'Heterogeneous': Monodisperse Pt Nanocrystals by Combining Shape-Controlled Synthesis and Purification by Colloidal Recrystallization," Journal of the American Chemical Society 135(7), pp. 2741-2747 (2013).
Kang, et al., "Shape-Controlled Synthesis of Pt Nanocrystals: The Role of Metal Carbonyls," ACS Nano 7(1), pp. 645-653 (2013).
Kirkland, et al., "Simulation of annular dark field stem images using a modified multislice method," Ultramicroscopy 23(1), pp. 77-96 (1987).
Klenov &Stemmer, "Contributions to the contrast in experimental high-angle annular dark-field images," Ultramicroscopy 106(10), pp. 889-901 (2006).
Liu, et al., "Self-Terminating Growth of Platinum Films by Electrochemical Deposition," Science 338(6112), pp. 1327-1330 (2012).
Liu, et al., "Synthesis and activation of Pt nanoparticles with controlled size for fuel cell electrocatalysts," Journal of Power Sources 164(2), pp. 472-480 (2007).
MacDonald, et al., "Hybrid Nanoscale Inorganic Cages," Nature Materials 9, pp. 810-815 (2010).
Mahmoud, et al., "Following Charge Separation on the Nanoscale in Cu2O—Au Nanoframe Hollow Nanoparticles," Nano Letters 11(8), pp. 3285-3289 (2011).
McEachran, et al., "Ultrathin Gold Nanoframes through Surfactant-Free Templating of Faceted Pentagonal Silver Nanoparticles," Journal of the American Chemical Society 133(21), pp. 8066-8069 (2011).
Nellist & Pennycook, "Incoherent imaging using dynamically scattered coherent electrons," Ultramicroscopy 78(1-4), pp. 111-124 (1999).
Niu, et al., "Synthesis of Pt—Ni Octahedra in Continuous-Flow Droplet Reactors for the Scalable Production of Highly Active Catalysts toward Oxygen Reduction," Nano Letters 16(6), pp. 3850-3857 (2015).
Oh, et al., "Galvanic Replacement Reactions in Metal Oxide Nanocrystals," Science 340(6135), pp. 964-968 (2013).
Oszajca, et al., "Precisely Engineered Colloidal Nanoparticles and Nanocrystals for Li-Ion and Na-Ion Batteries: Model Systems or Practical Solutions?," Chemistry of Materials 26(19), pp. 5422-5432 (2014).
Park & Xia, "Macroporous Membranes with Highly Ordered and Three-Dimensionally Interconnected Spherical Pores," Advanced Materials 10(13), pp. 1045-1048 (1998).
Perdew, et al., "Atoms, molecules, solids, and surfaces: Applications of the generalized gradient approximation for exchange and correlation," Physical Review B 46(11), pp. 6671-6687 (1992).
Pupek, "Continuous Flow Synthesis, a Platform to Accelerate the Transition of Nanomaterials to Manufacturing," Informatics, Electronics and Microsystems: TechConnect Briefs 2018, pp. 130-133 (2018).
Schlogl, et al., "Ambient Pressure Photoelectron Spectroscopy: A new tool for surface science and nanotechnology," Surface Science Reports 63(4), pp. 169-199 (2008).
Skrabalak, et al., "Gold Nanocages: Synthesis, Properties, and Applications," Accounts of Chemical Research 41(12), pp. 1587-1595 (2008).
Snyder, et al., "Oxygen reduction in nanoporous metal-ionic liquid composite electrocatalysts," Nature Materials 9, pp. 904-907 (2010).
Stamenkovic, et al., "Surface Composition Effects in Electrocatalysis: Kinetics of Oxygen Reduction on Well Defined Pt3Ni and Pt3Co Alloy Surfaces," Journal of Physical Chemistry B 106(46), pp. 11970-11979 (2002).
Subbaraman, et al., "Enhancing Hydrogen Evolution Activity in Water Splitting by Tailoring Li—Ni(OH)2-Pt Interfaces," Science 334(6060), pp. 1256-1260 (2011).
Tang, et al., "Electrochemical Stability of Nanometer-Scale Pt Particles in Acidic Environments," Journal of the American Chemical Society 132(2), pp. 596-600 (2010).
Tao, et al., "Reaction-Driven Restructuring of Rh—Pd and Pt—Pd Core-Shell Nanoparticles," Science 322(5903), pp. 939-934 (2008).
Van Der Vliet, et al., "Mesostructured thin films as electrocatalysts witn tunable composition and surface morphology," Nature Materials 11, pp. 1051-1058 (2012).
Van Der Vliet, et al., "Unique Electrochemical Adsorption Properties of Pt-Skin Surfaces," Angewandte Chemie 124(13), pp. 3193-3196 (2012).
Vanderbilt, "Soft self-consistent pseudopotentials in a generalized eigenvalue formalism," Physical Review B 41(11), pp. 7892-7895 (1990).
Wang & Li, et al., "Effective Octadecylamine System for Nanocrystal Synthesis," Inorganic Chemistry 50(11), pp. 5196-5202 (2011).
Wang et al., "Monodisperse Pt3Co Nanoparticles as a Catalyst for the Oxygen Reduction Reaction: Size-Dependent Activity," The Journal of Physical Chemistry C 113(45), pp. 19365-19368 (2009).
Wang, et al., "Kirkendall Effect and Lattice Contraction in Nanocatalysts: A New Strategy to Enhance Sustainable Activity," Journal of the American Chemical Society 133(34), pp. 13551-13557 (2011).
Wang, et al., "One-Pot Solution Synthesis of Cubic Cobalt Nanoskeletons," Advanced Materials 21(16), pp. 1636-1640 (2009).
Wang, et al., "Phase and Interface Engineering of Platinum-Nickel Nanowires for Efficient Electrochemical Hydrogen Evolution," Angewandte Chemie 55(41), pp. 12859-12863 (2016).
Wang, et al., "Structurally ordered intermetallic platinum-cobalt core-shell nanoparticles with enhanced activity and stability as oxygen reduction electrocatalysts," Nature Materials 12, pp. 81-87 (2013).
Wu, et al., "Shape and Composition-Controlled Platinum Alloy Nanocrystals Using Carbon Monoxide as Reducing Agent," Nano Letters 11(2), pp. 798-802 (2011).
Wu, et al., "Syntheses of Water-Soluble Octahedral, Truncated Octahedral, and Cubic Pt—Ni Nanocrystals and Their Structure-Activity Study in Model Hydrogenation Reactions," Journal of the American Chemical Society 134(21), pp. 8975-8981 (2012).
Wu, et al., "Truncated Octahedral Pt3Ni Oxygen Reduction Reaction Electrocatalysts," Journal of the American Chemical Society 132(14), pp. 4984-4985 (2010).
Xin, et al., "Revealing the Atomic Restructuring of Pt—Co Nanoparticles," Nano Letters 14(6), pp. 3203-3207 (2014).
Yadavali, et al., "Silicon and glass very large scale microfluidic droplet integration for terascale generation of polymer microparticles," Nature Communications 9, 1222, 9 pages (2018).
Yavuz, et al., "Gold nanocages covered by smart polymers for controlled release with near-infrared light," Nature Materials 8, pp. 935-939 (2009).
Yin, et al., "Formation of Hollow Nanocrystals Through the Nanoscale Kirkendall Effect," Science 304(5671), pp. 711-714 (2004).
Zeng, et al., "A Comparison Study of the Catalytic Properties of Au-Based Nanocages, Nanoboxes, and Nanoparticles," Nano Letters 10(1), pp. 30-35 (2010).
Zhang, et al., "Synthesis and Oxygen Reduction Activity of Shape-Controlled Pt3Ni Nanopolyhedra," Nano Letters 10(2), pp. 638-644 (2010).

\* cited by examiner

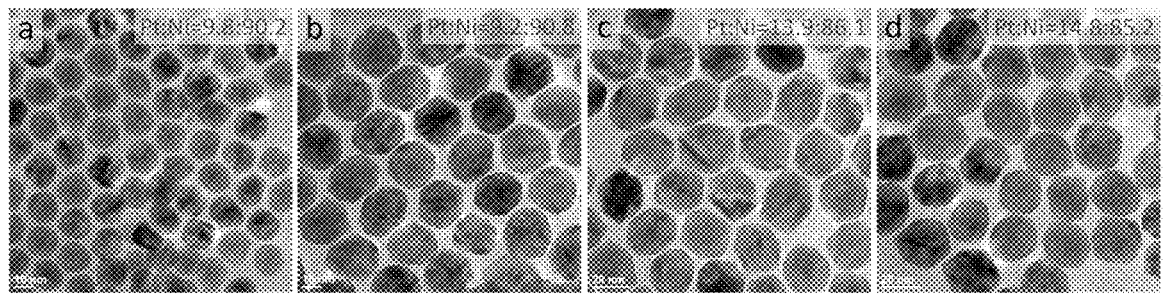
| Fig. 3A | Fig. 3B | Fig. 3C | Fig. 3D |
RW082-5min  
Pt:Ni=6.9:93.1
RW082-11min  
Pt:Ni=4.7:95.3
RW082-30min  
Pt:Ni=7.7:92.3
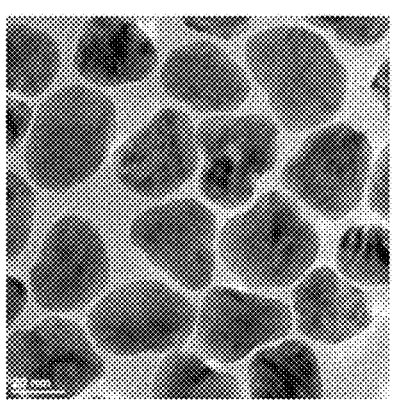 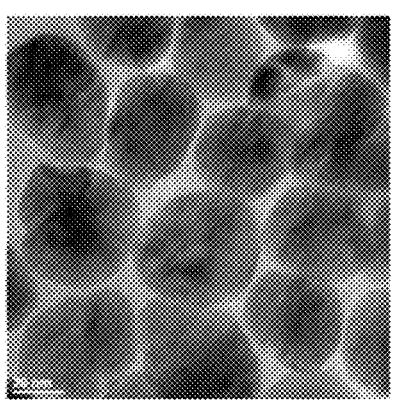 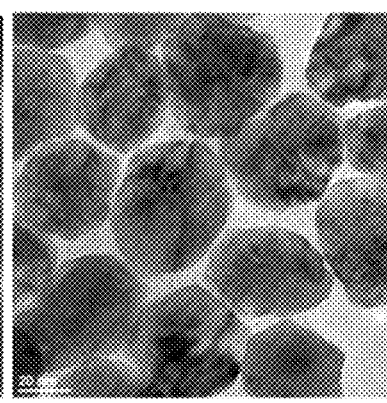
| Fig. 4A | Fig. 4B | Fig. 4C |
RW082-60min  
Pt:Ni=10.4:89.6
RW082-1h-C  
Pt:Ni=10.4:89.6
RW082-1h-C-A1  
Pt:Ni=70.5:29.5
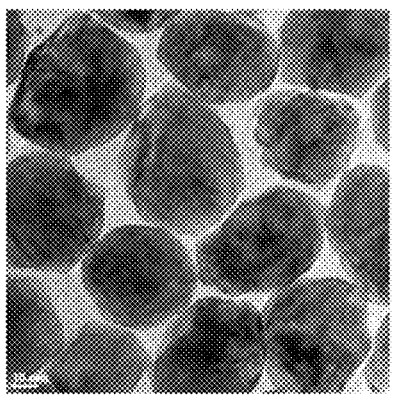 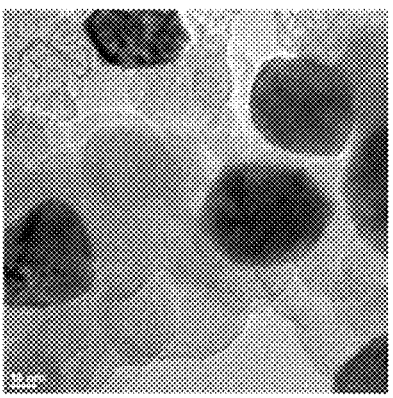 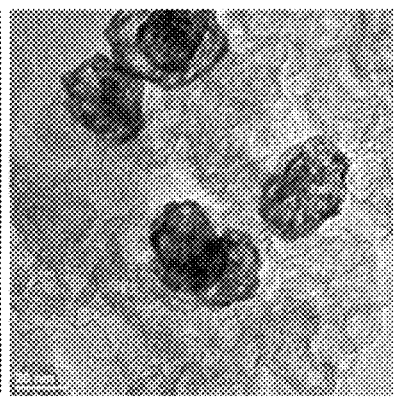
| Fig. 4D | Fig. 4E | Fig. 4F |

RW083-2min
Pt:Ni=10.2:89.8

RW083-5min
Pt:Ni=6.5:93.5

RW083-10min
Pt:Ni=5.6:94.4

RW083-30min
Pt:Ni=8.5:91.5

RW083-60min
Pt:Ni=11.3:88.7

RW083-1h-C-A1
Pt:Ni=74.2:25.8

RW079-5min
Pt:Ni=10.3:89.7
RW079-10min
Pt:Ni=8.8:91.2
RW079-30min
Pt:Ni
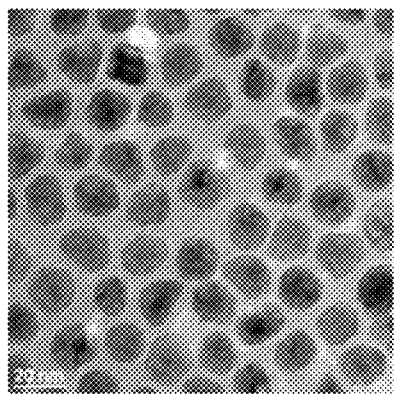
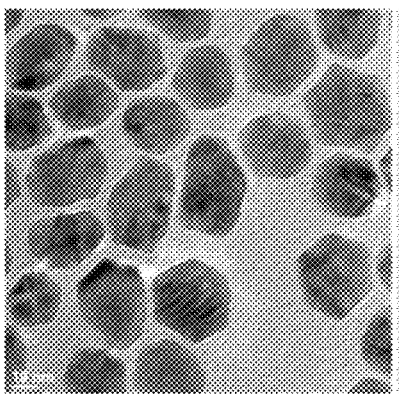
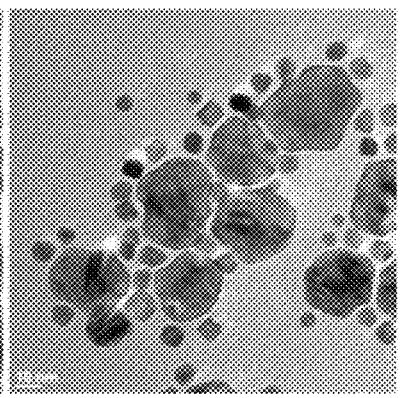
Fig. 6A
Fig. 6B
Fig. 6C
RW079-60min
Pt:Ni=20:80
RW079-1h-C
Pt:Ni=19:81
RW079-1h-C-A1
Pt:Ni=79.8:20.2
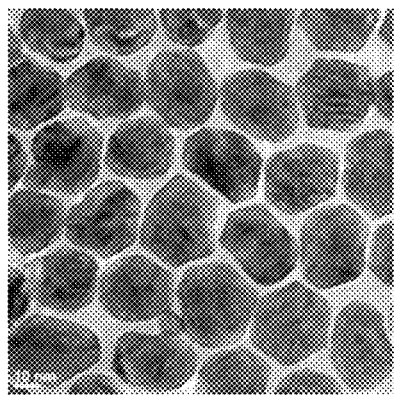
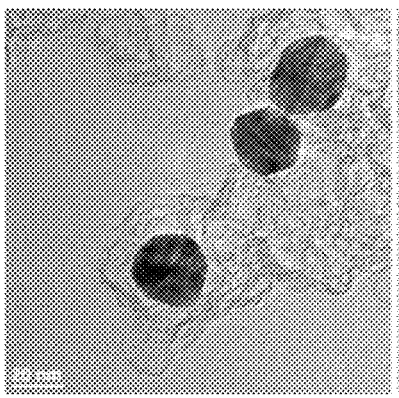
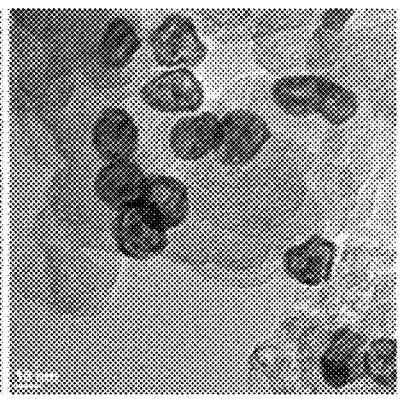
Fig. 6D
Fig. 6E
Fig. 6F RW080-5min
Pt:Ni=17.2:82.8
RW080-10min
Pt:Ni=20.5:79.5
RW080-30min
Pt:Ni=27.2:72.8
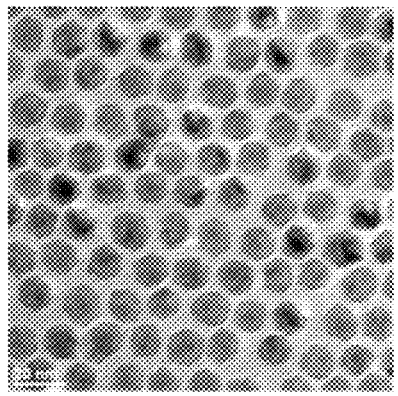
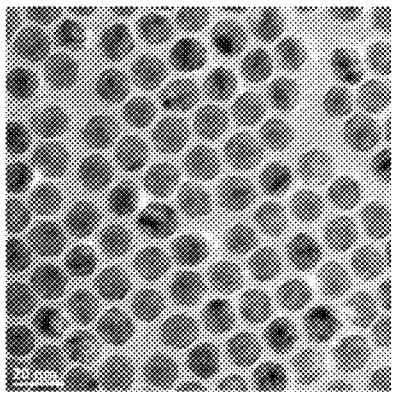
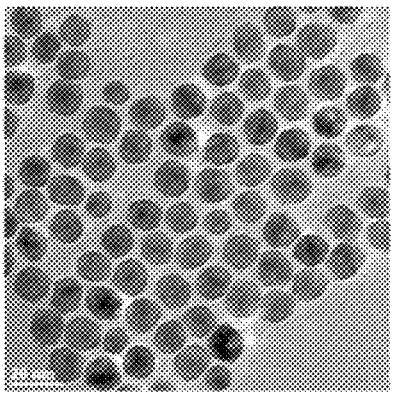
Fig. 7A
Fig. 7B
Fig. 7C
RW080-1h
Pt:Ni=28.1:71.9
RW080-1h-C
Pt:Ni=27.3:72.7
RW080-1h-C-A1
Pt:Ni=72.1:27.9
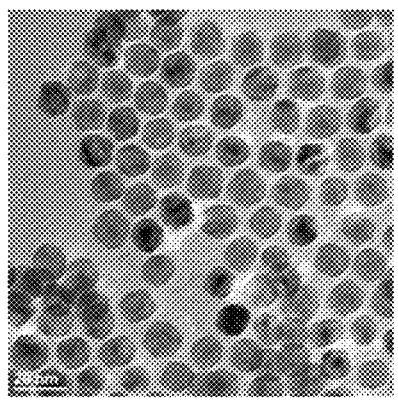
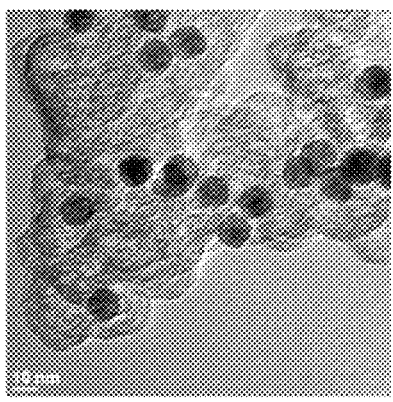
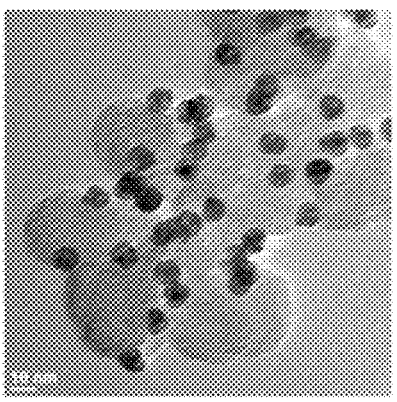
Fig. 7D
Fig. 7E
Fig. 7F

SYSTEMS AND METHODS FOR PTNI NANOCAGES

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to method of synthesizing and compositions for platinum based nanomaterials, particularly platinum nickel nanocage structures.

BACKGROUND

In the last few decades, significant efforts have been devoted to improving the activity and durability of Pt based nanomaterials for oxygen reduction reaction (ORR) aiming to overcome the high price and scarcity problems of Pt based catalysts for fuel cell application in stationary and automobile sectors. Since the discovery of the 90-fold activity improvements of nano-segregated $Pt_3Ni(111)$ surface in comparison to commercially available platinum on carbon (Pt/C) catalyst, a variety of nanocrystals with different shapes and significant improved activities have been developed, in most cases, using solution-phase synthesis methods. In contrast to Pt/C catalyst prepared by impregnation method, these nanocrystals made by solution-phase synthesis usually have well controlled shape and composition and monodispersed particle size; thus, their surfaces could be fine-tuned to give much higher catalytic activities. However, usually these highly active nanocrystals can only be made in milligram scale because great attention has to be paid in the synthesis and post-treatment processes in order to keep the desired morphologies, particle sizes, and surface composition profiles. This is barely enough for physical characterizations and electrocatalytic activity testing on rotating disk electrode (RDE), their performances in real fuel cell membrane electrode assembly (MEA) have been rarely investigated which greatly hinders the commercialization of fuel cell technology. Gram scale of high quality nanocrystal catalyst should be made available for MEA testing, in order to bridge the gap between fundamental researches and real device investigations.

Multi-layered Pt-skin nanoparticle catalyst have been synthesized by solution-phase synthesis with a series of post-treatment processes. Solution-phase synthesis provides the advantage of shape, size and composition control. U.S. Pat. No. 9,246,177 describes one process for monodispersed PtNi bi-metallic nanoparticles, such as with a size of around 5 nanometers (nm), using a hot-injection synthesis method in organic solvent. Prior techniques for synthesis have utilized a hot injection method that requires a multi-step process of 1) injection facilitated synthesis, 2) loading on carbon, 3) acid leaching, and 4) annealing. In step 1, a mixture of nickel acetate tetrahydrate, 1,2-tetradecanediol, oleic acid, oleylamine, and either diphenyl ether or dibenzyl either is heated to 200° C. To this heated mixture, a pre-heated (~80° C.) Pt solution is injected. The Pt solution comprises platinum (II) acetylacetonate in 1, 2-dichlorobenzene. The combined solution is then held at 200° C. for an hour. After separation from synthesis solvents, in a second step, the PtNi nanoparticles are loaded onto high surface area carbon by evaporating off the solvents from the first step. Next, in a third step, the resultant loaded PtNi/C material is acid leached by sonicating directly in the acidic solution and then centrifuged to separate the acid. In a fourth step, the acid leached PtNi/C undergoes annealing in hydrogen atmosphere to smoothen the surface and form a Pt-skin surface structure. With all these sophisticated synthesis and post-treatment procedures, a nanoparticle catalyst with multi-layered Pt-skin structure similar to that on bulk thin film surface was prepared which shows over 6-fold activity enhancement and significant durability improvement compared with commercial Pt/C catalyst.

However, this process exhibits several drawbacks and flaws that hinder scaling of the process. Further, the resultant product is a typical solid nanoparticle with size less than 5 nanometers. Fundamental researches reveal that bulk alloy surfaces usually show significant performance and durability benefit over the surfaces of small nanoparticle catalysts which have lots of low-coordinated Pt atoms. However, bulk alloy or bigger nanoparticles usually have very limited surface areas which limit their real application. In this regards, a cage structure which have larger general particle size (thus less low-coordinated Pt atoms on surface) but still high surface area (because of the hollow structure) is promising structure for both high performance (activity and durability) and high surface area.

SUMMARY

Embodiments described herein relate generally to a method of synthesizing PtNi nanocage catalyst comprising the steps of: synthesizing $Pt_1Ni_6$ nanoparticles having a Pt rich shell and a Ni rich core and acid leaching the $Pt_1Ni_6$ nanoparticles. The synthesis proceeds by mixing a nickel precursor, a surfactant, a platinum precursor, and a polar solvent at a temperature of at least 230° C. forming a $Pt_1Ni_6$ nanoparticle solution. The acid leaching proceeds by mixing an acid with the $Pt_1Ni_6$ nanoparticle a temperature above 80° C.; removing Ni from the nanoparticles to form nanocages; and collecting the nanocages.

Other embodiments described herein relate generally to a method of synthesizing PtNi nanocage catalyst comprising the steps of synthesizing $Pt_1Ni_6$ nanoparticles having a Pt rich shell and a Ni rich core and acid leaching the $Pt_1Ni_6$ nanoparticles. The synthesizing $Pt_1Ni_6$ nanoparticles having a Pt rich shell and a Ni rich core proceeds by mixing a nickel precursor, a surfactant, a platinum precursor, and a polar solvent to form a reaction solution, the ratio of nickel precursor to platinum precursor being 10:90 to 40:60 wt. %; holding the solution at a temperature of at least 110° C. to remove dissolved oxygen and moisture; and heating the solution to at least 230° C. for at least 30 minutes and forming a $Pt_1Ni_6$ nanoparticle solution. The acid leaching the $Pt_1Ni_6$ nanoparticles proceeds by mixing an acid with the $Pt_1Ni_6$ nanoparticle solution at temperature above 80° C.; removing Ni from the nanoparticles to form nanocages; and collecting the nanocages.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIGS. 3A-3D show the evolution of $Pt_1Ni_6$ nanoparticles with reaction time. FIG. 3A: 2 min; FIG. 3B: 10 min; FIG. 3C: 30 min; FIG. 3D: 60 min.

FIGS. 4A-F show PtNi nanoparticles synthesized in 10 ml dibenzyl ether at 235° C. for different time and after loading on carbon and further acid leaching. 65 mg Pt(acac)2 was used. FIG. 4A is for 5 minutes with atomic ratio of Pt:Ni=6.9:93.1; FIG. 4B is for 11 minutes with atomic ratio of Pt:Ni=4.7:95.3; FIG. 4C is for 30 minutes with atomic ratio of Pt:Ni=7.7:92.3; FIG. 4D is for 60 minutes with atomic ratio of Pt:Ni=10.4:89.6; FIG. 4E is for 1 hr and loaded on carbon with atomic ratio of Pt:Ni=10.4:89.6; FIG. 4F is for 1 hour and after acid leaching with atomic ratio of Pt:Ni=70.5:29.5.

FIG. 5A is for 2 min with atomic ratio of Pt:Ni=10.2:89.5; FIG. 5B is for 5 min with atomic ratio of Pt:Ni 6.5:93.5; FIG. 5C is for 10 min with atomic ratio of Pt:Ni=5.6:94.4; FIG. 5D is for 30 min with atomic ratio of Pt:Ni=8.5:91.5; FIG. 5E is for 60 min with atomic ratio of Pt:Ni=11.3:88.7; FIG. 5F is for 1 hr and after acid leaching with atomic ratio of Pt:Ni=74.2:25.8.

FIGS. 6A-F show PtNi nanoparticles synthesized in 10 ml dibenzyl ether at 240° C. for different time and after loading on carbon and further acid leaching. 65 mg Pt(acac)2 was used. FIG. 6A is for 5 minutes with atomic ratio of Pt:Ni=10.3:89.7; FIG. 6B is for 10 minutes with atomic ratio of Pt:Ni=8.8:91.2; FIG. 6C is for 30 minutes; FIG. 6D is for 60 minutes with atomic ratio of Pt:Ni=20:80; FIG. 6E is for 1 hr and loaded on carbon with atomic ratio of Pt:Ni=19:81; FIG. 6F is for 1 hour and after acid leaching with atomic ratio of Pt:Ni=79.8:20.2.

FIGS. 7A-F show PtNi nanoparticles synthesized in 10 ml diphenyl ether at 240° C. for different time and after loading on carbon and further acid leaching. 65 mg Pt(acac)2 was used. FIG. 7A is for 5 min with atomic ratio of Pt:Ni=17.2:82.8; FIG. 7B is for 10 min with atomic ratio of Pt:Ni 20.5:79.5; FIG. 7C is for 30 min with atomic ratio of Pt:Ni=27.2:72.8; FIG. 7D is for 1 hr with atomic ratio of Pt:Ni=28.1:71.9; FIG. 7E is for 1 hr and loaded on carbon with atomic ratio of Pt:Ni=27.3:72.7; FIG. 7F is for 1 hr after acid leaching with atomic ratio of Pt:Ni=72.1:27.9.

Figure 1:
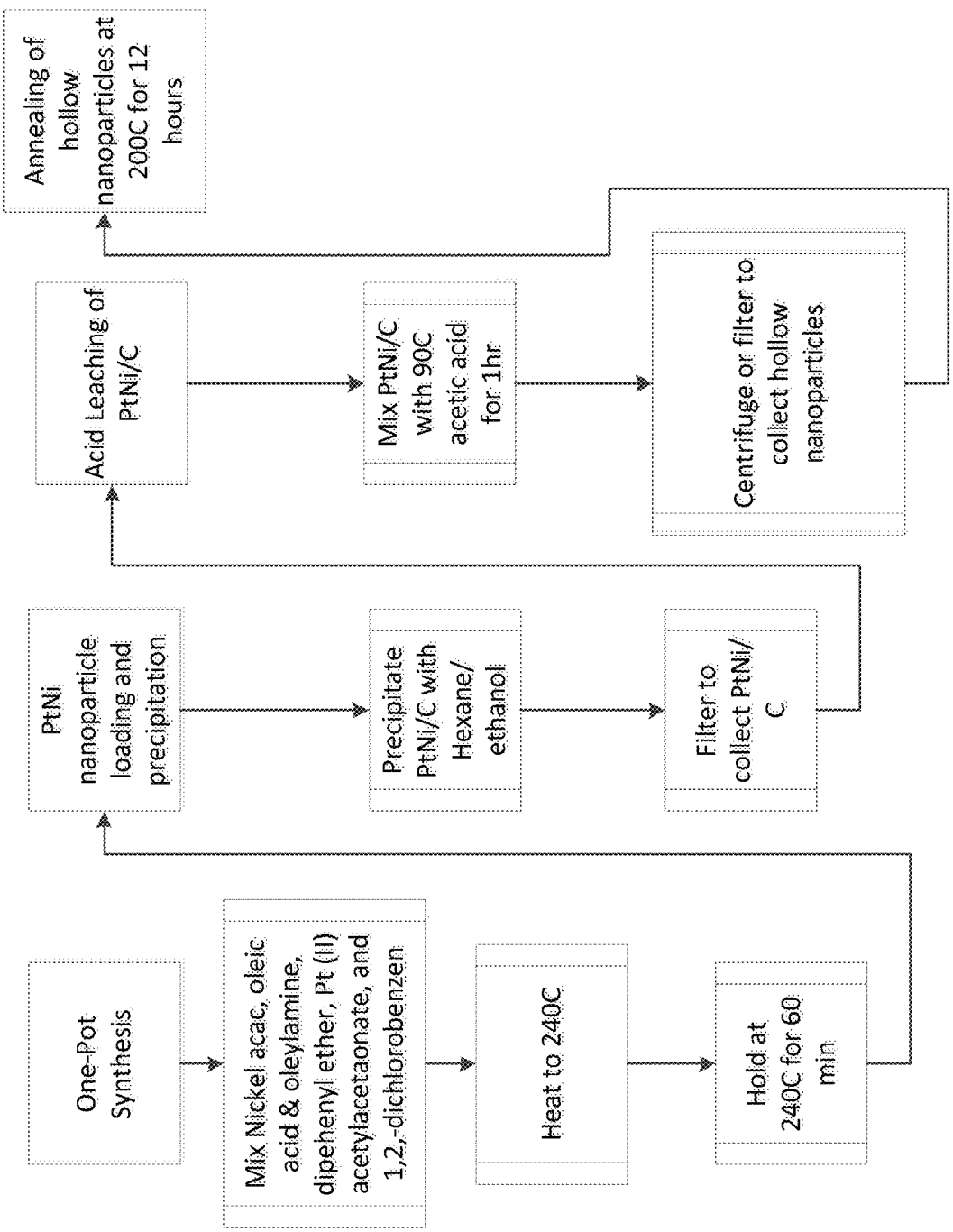
FIG. 1 is a schematic illustration of a multi-step synthesis procedure of PtNi nanocages.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Described herein is a scalable process to manufacture PtNi nanocages. The resultant nanocages exhibit significant (10-12×) Pt mass specific activity in comparison to existing commercial Pt/C catalysts.

Previously, Pt nanocages have been prepared using Pd nanostructures as templates. With subnanometer-thick walls, these Pt nanocages show significant mass specific activity improvement compared with Pt/C catalyst. However, synthesis of PtNi nanocage with this prior template method is very challenging as the procedure. While a PtNi shell can be plated on Pd templates, the process necessary to remove the Pd will also remove Ni from the shell. An alternative attempt to create feasible Pt nanocages focused on galvanic replacement reactions to make metal nanostructures with hollow interiors. However, the surface of these nanostructures is usually rough, notably rougher than Pt/C or PtNi/C nanoparticles or templated nanocages, when Pt nanostructures were synthesized with this method. At least in part due to this increased roughness, the galvanic method leads to nanocages with ORR activity improvements that are only moderate.

Described herein are methods and compositions relating to Pt nanocages, specifically PtNi nanocages, that utilize a pathway wherein $Pt_1Ni_6$ nanoparticles with segregated Pt and Ni are synthesized. With the Ni primarily isolated to specific regions of the nanoparticles, the Ni can be selectively removed to create a PtNi nanocage. In a previous effort, a one pot synthesis of PtNi nanoparticles with size of 4 nm and processes to manufacture up to 5 g/batch catalyst is described (see, U.S. patent application Ser. No. 15/996, 297. In that synthesis, a strong reducing agent-1,2-tetradecanediol was used which results in fast nucleation and formation of smaller particles, such as 4 nm, at relatively lower reaction temperature, for such synthesis, of 200° C. with uniform distribution of Pt and Ni elements in the particle. The method described herein eliminates the strong reducing agent-1,2-tetradecanediol and increases the amount of mild reducing agent-oleylamine. The process described herein utilizes a different reduction rate of Pt and Ni than that of the referenced U.S. Pat. application.

In one particular embodiment, the Ni precursor used is Nickel(II) acetylacetonate, as opposed to a nickel precursor, such as nickel acetate tetrahydrate, which contains water, as the water needs to be removed before reaction. The ratio between Pt precursor and Ni precursor is between 1:9 and 4:6. The reaction temperature is between 220 and 250° C., such as 240° C.

As a result, the presently described process utilizes a reduction rate (increased relative to the prior "one-pot" method) of Ni vs. Pt. The result of the process described, such as shown in FIG. 1, step 1, is $Pt_1Ni_6$ nanoparticles. These nanoparticles are, for example 20 nm with phase segregation. This compares with particles made with previous methods that are $Pt_1Ni_1$ nanoparticles of 4 nm with uniform element distribution.

Figure 8:
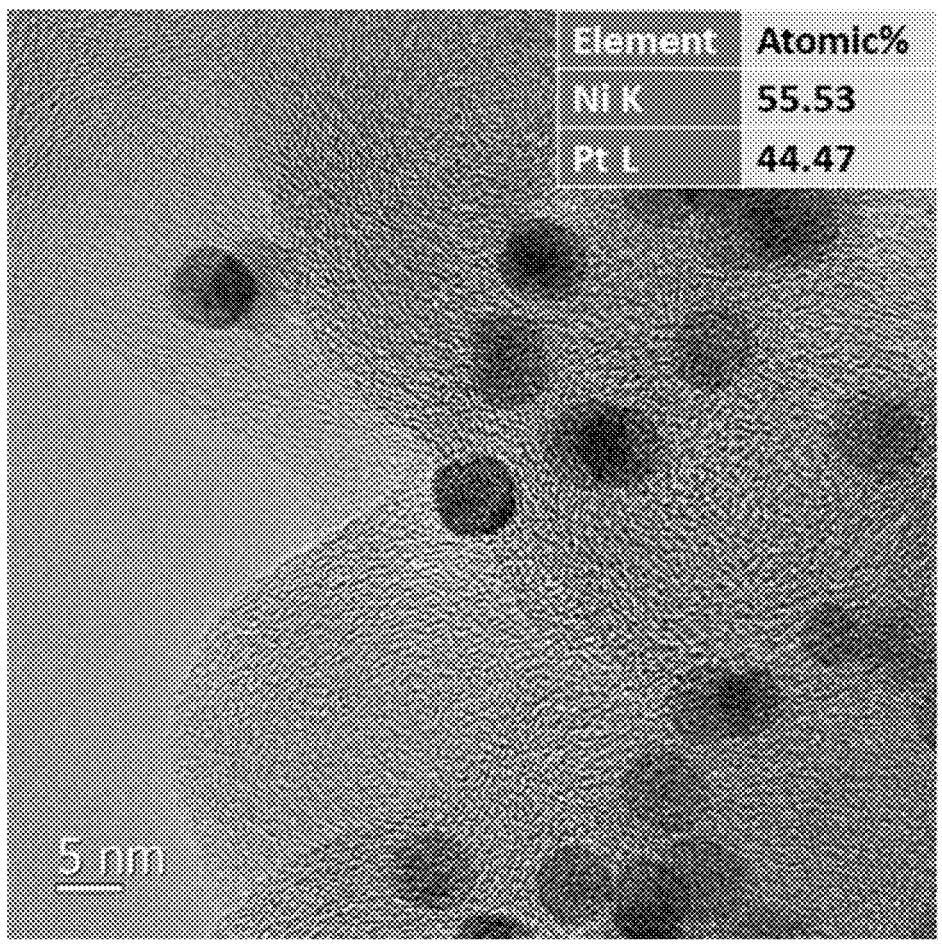
FIG. 8. PtNi nanoparticles synthesized in 10 ml diphenyl ether at 240° C. for 1 hour and loaded on carbon. 130 mg Pt(acac)2 was used.

The impact of the solvent on the creation of nanocages was also considered. In dibenzyl ether or a mixture of diphenyl ether and dibenzyl ether, the process described herein results in PtNi nanoparticles with phase separation and get nanocage structure after acid leaching, although the particle size is much larger and less monodispersed than in diphenyl ether (FIGS. 4A-F and 5A-F). In addition, in dibenzyl ether, the reaction temperature is preferably lower than 240° C. in order to avoid secondary nucleation for Pt in the late stage of the particle formation (FIGS. 6A-F). In diphenyl ether, the particle size and composition is tunable by changing the precursor ratio between Pt and Ni. As shown in FIG. 7A-F, $Pt_1Ni_3$ nanoparticle with size of 17 nm could be made by increasing the amount of Pt precursor. The nanocage structure in this case is smaller than in FIG. 2. Further increase the amount of Pt precursor, smaller particle could be synthesized. As shown in FIG. 8, PtNi nanoparticle with size of 6 nm is synthesized. Although the structure of this particle (have phase separation) is different with previously synthesized (no phase separation) in the presence of strong reducing agent (1,2-tetradecanediol), it is not possible to form nanocage structure even after acid leaching, because the particle is too small and Pt rich. However, these uniform nanoparticles with controlled particle size and composition synthesized by this method may find application in other areas.

FIG. 1 shows a synthesis process in accordance with one embodiment. Step 1 is a one-pot synthesis using diphenyl ether solvent to produce $Pt_1Ni_6$ nanoparticles. Step 2 is the optional loading of the nanoparticles onto a substrate, such as carbon. In some embodiments, the nanoparticles are not loaded onto a substrate, resulting in "free" nanocages. Step 3 is removal of at least a portion of the nickel nanoparticles by acid leaching. It is believed that the Pt nuclei remains and form part of the nanocage. Step 4 is annealing of the hollowed nanoparticle.

In one embodiment, Step 1 includes the addition of a nickel precursor, such as nickel (II) acetylacetonate, a surfactant such as oleic acid and/or oleylamine, platinum precursors, such as platinum(II) acetylacetonate, and in one embodiment, a polar solvent such as 1,2-dichlorobenzene or such as an either, for example, dibenzyl ether, diphenyl ether, or a combination of such, is utilized. The ratio of Pt precursor to Ni precursor may be varied to control nanoparticle size and content of Ni, for example from 5:95 to 80:20, preferably 10:90 to 40:60. The content of Ni, in turn, impacts the ability to "hollow" out the nanoparticle by leaching the Ni core. As the Pt:Ni precursor ratio increases, the result will be a smaller particle and more Pt rich particle. The ratio of the precursors should be such that the Pt and Ni exhibit phase separation in the nanoparticle. The nickel precursor is preferred to be one that will not hydrate water, as such will provide a disadvantageous reaction environment. Diphenyl ether may be used as a solvent for the reaction. The 1,2-dichlorobenzene results in increased uniformity in particle size. The ratio of oleic acid to oleylamine may be varied to control particle size, with increasing ratio of oleic acid associated with smaller particle size. Unlike PtNi/C nanoparticle formation for use in creation of solid nanoparticles, the strong reducing agent (1,2-tetradecanediol) is eliminated in order to decrease the reaction rate. In one embodiment, 1-3 ml oleylamine and/or 0.4-1 ml oleic acid is utilized. The temperature range is 230-245° C. The result of the one-pot synthesis is nanoparticles having a Pt skin, with a Ni core having a Pt nucleus with the nanoparticles being $\sim Pt_1N_6$ and $\sim 20$ nm.

Further, the initial synthesis step, the process proceeds by a one-pot approach. In one embodiment, the materials are added without order requirement. The materials may be purged with an inert gas at greater than room temperature to remove oxygen and moisture water. The temperature to remove water could be between 100° C. and 150° C. for several minutes to several hours. Dissolved oxygen may be removed by holding temperature at 110° C. for 20 min prior to the synthesis, to facilitate Ni reduction.

In one embodiment, following the one-pot synthesis of $Pt_1Ni_6$ nanoparticles, the $Pt_1Ni_6$ nanoparticles are collected. In one embodiment, the nanoparticles are collected by precipitation using a solvent for example hexane or heptane. With the nanoparticles precipitated or precipitating out of the liquid, filtration is utilized to collect the solid nanoparticles. Alternatively, centrifugation could also be used. In addition, evaporation of the solvent (e.g., hexane) could be used. In one embodiment, pressurized filtration is used.

With regard to Step 2, either following or prior to the collection of the solid $Pt_1Ni_6$ nanoparticles from Step 1, the nanoparticles are loaded onto a substrate and then collected. It should be appreciated that this step is optional, depending on the intended use of the nanocages. The substrate utilized in the tests described herein was carbon, such as for use in fuel cells. The substrate is preferably acid corrosion resistant and conductive. The PtNi particles are mixed and sonicated with pre-dispersed carbon. Carbon was dispersed in chloroform with ratio of 0.1-0.4 g carbon in 100 ml chloroform by sonication (10 min to 2 h dependent on amount of carbon). Carbon was dispersed in chloroform by sonication. Then particle dispersed in chloroform were mixed in, then further sonication for 10-20 min. The $Pt_1Ni_6$ then "loads" onto the carbon in the chloroform. The loading can be tuned by changing the particle carbon ratio. In one embodiment, loading can be up to 20% weight of $Pt_1Ni_6$ on carbon. For nanocage, the loading could be 1-80%. After loading, the $Pt_1Ni_6/C$ is precipitated by adding a solvent for example hexane or heptane. With the $Pt_1Ni_6/C$ precipitated or precipitating out of the liquid, filtration is utilized to collect the solid $Pt_1Ni_6/C$. Alternatively, centrifugation could also be used as could evaporation of the solvent (e.g., hexane). In one embodiment, pressurized filtration is used. In the examples described herein, a filter of polycarbonate with size of 0.1-0.4 um was used. Larger pore size provides for faster filtration. But as long as the catalyst amount vs. filter area achieves a desired value (for 0.4 um filter, 20 mg catalyst/cm² filter area), pore size of filter doesn't matter since the limiting step is the solvent going through the catalyst layer. It also depends on the carbon supports used. For other carbon, catalyst layer could be thicker without problem. A 0.1-0.4 um pore size filter can remove everything from the mixture (solvent goes through filter are clear).

For larger amount of $Pt_1Ni_6$ nanoparticles, the dispersion of nanoparticle on carbon is not uniform in pure hexane even by adding particles into carbon (both dispersed in hexane) drop by drop during sonication. This difficulty in loading at higher amounts of $Pt_1Ni_6$ was exhibited by the prior injection process described previously. Further, such non-uniform dispersion of $Pt_1Ni_6$ nanoparticle on carbon will cause sintering problem in the later annealing steps. As described, in one embodiment, the $Pt_1Ni_6$ is dispersed with carbon using chloroform as dispersing solvent. The use of chloroform results in more uniform loading. However, the very properties that make for a superior dispersing solvent mean that catalyst separation from chloroform is very challenging.

Significant amounts of $Pt_1Ni_6$ particles or carbon are still left in chloroform when utilizing the centrifuging separation described in the prior art. For example, separating by centrifuging at 8000 rpm as described above for the separation step of the injection process in small scale is not feasible. It has been observed that in accordance with embodiments described above, adding hexane into chloroform dispersed carbon and PtNi nanoparticles surprisingly results in carbon supported PtNi nanoparticles precipitating out from the mixture in several minutes and more importantly, the dispersion of PtNi nanoparticle on carbon is very uniform. In one embodiment, a Hexane:chloroform ratio higher than 1:1 is used. Generally, the higher the hexane ratio, the faster the separation. The speed of the separation depends on different factors, including particle size of PtNi (with bigger particle size equating to faster separation). Generally, separating occurs in 5-30 min for 99.9% separation. The uniform loading of PtNi nanoparticles on carbon in chloroform and its easy separation by adding hexane may be related to the density similarity and difference of surfactant protected PtNi nanoparticle with chloroform and hexane, respectively.

In step 3, the collected solid nanoparticles are then added to an acid bath to remove the Ni core. Acid leaching for a $Pt_1Ni_1$ particle only removes the Ni in the surface several atomic layers because of the Pt content is too high for further penetration of acid into the particle. For $Pt_1Ni_6$ nanoparticles, it is believed that the surface Pt rich shell is not uniform and have some Ni rich phases where the acid can penetrate into the inner of the particle from these pin-holes when Ni is removed in the Ni rich areas. Thus, there are several holes in the $Pt_1Ni_6$ nanocage structure formed by the leaching of Ni at the surface and which facilitate the leaching of the Ni core. In one embodiment, acetic acid was used, at a temperature above 80° C., such as 80-110° C., for example ~90° C. The acid leaching occurs for 30 min to 10 hours depending on the acid leaching temperature, with lower temperatures within the range requiring longer leaching and vice versa Acid leaching could be directly applied on the particles supported on carbon which are dispersed in Hexane. The dispersion is very good and for such embodiments sonication is not necessary. Acid was washed by ethanol and hexane for several times to end the leaching. The mixture of nanoparticles and acid may be stirred, such as a constant stirring, to provide for efficient removal of the Ni. In one embodiment, acetate acid is utilized as the acid. The acid leaching results in hollow PtNi nanoparticles that exhibit surface openings to the hollow core, i.e. nanocages. In one embodiment, the nanocages are $Pt_xNi_y$ nanocages where x:y is between 1:2 and 3:1, such as $Pt_1Ni_1$.

Following the acid leaching of PtNi nanoparticles, the PtNi nanocages are collected. In one embodiment, the nanocages are collected by filtration. Alternatively, centrifugation could also be use. Solvents could also be removed by evaporation.

For step 4, the hollow PtNi nanoparticle is annealed. The annealing atmosphere is air, annealing temperature is between 180° C. and 300° C. (such as 200° C.), annealing time is between 1 h and 24 hours (such as 12 hours). Annealing is not necessary for cage structure formation but provides for surfactant removal and surface smoothening.

In one embodiment, the resultant nanocages exhibit a higher content of Ni than previously reported. Specifically, in some embodiments, the nickel content is 20-75%, such as 50% to 75%.

EXAMPLE

Figure 2A:
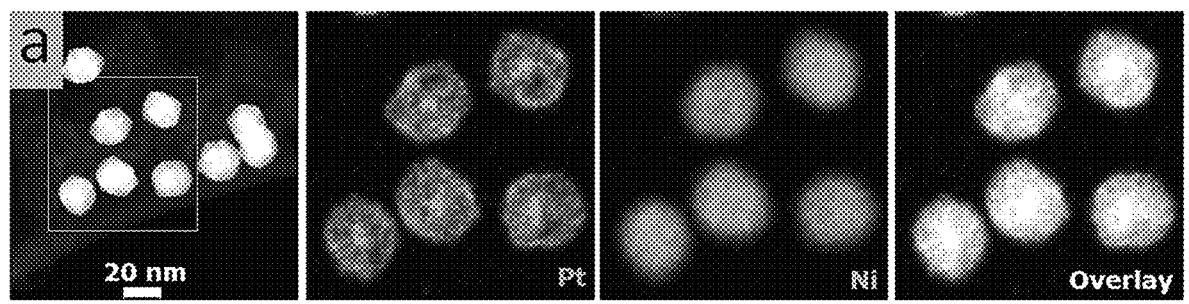
FIG. 2A shows EDX mapping demonstrating the inner Ni and outer Pt structure.
Figures 2B, 2C:
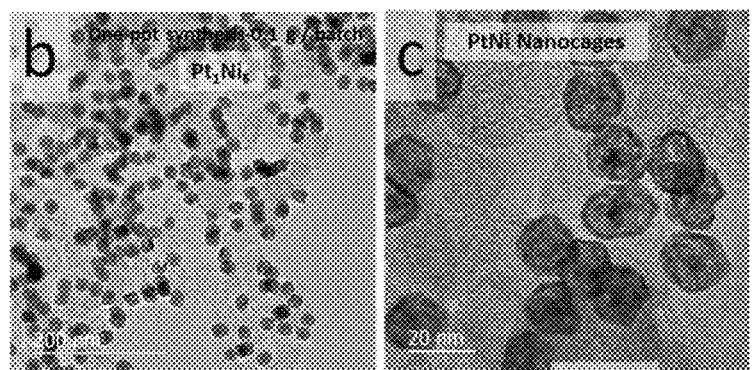
FIGS. 2B-C show micrographs of a 0.1 g batch before acid leaching (FIG. 2B), and after acid leaching (FIG. 2C)
Figures 2D, 2E:
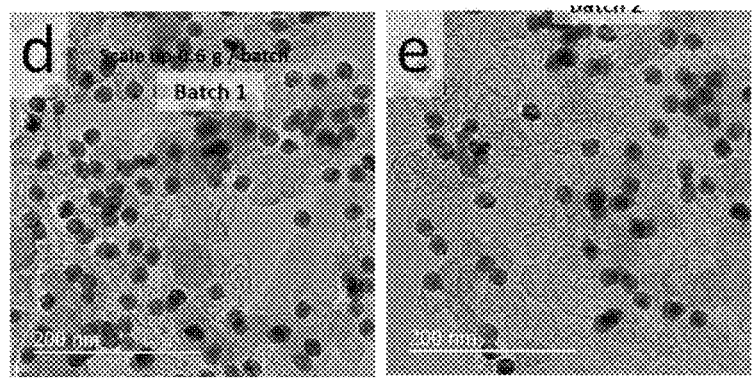
FIGS. 2D-E show micrographs of two 0.6 g batch before acid leaching.
Figure 2F:
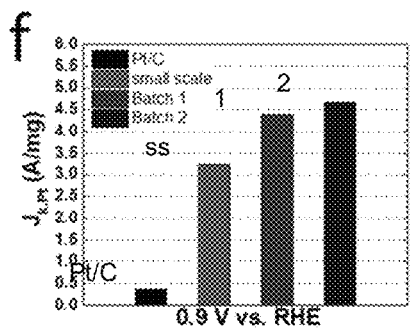
FIGS. 2F-G show electrochemical results of PtNi nanocages.
Figure 2G:
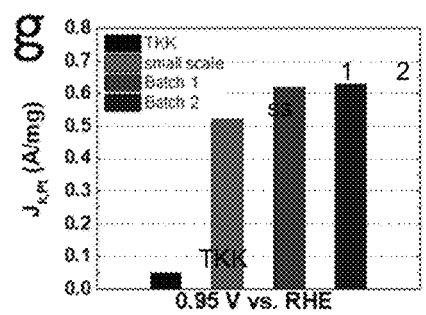
Figure 5A:
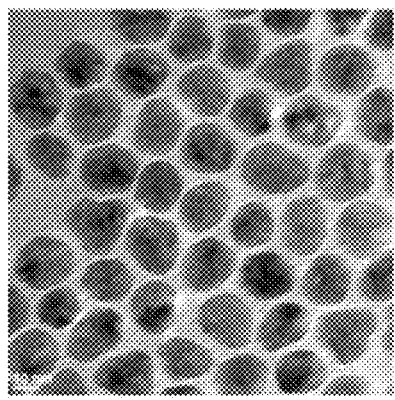
FIGS. 5A-F show PtNi nanoparticles synthesized in 9 ml dibenzyl ether and 1 ml diphenyl ether mixed solvents at 240° C. for different time and after loading on carbon and acid leached. 65 mg Pt(acac)2 was used.
Figure 5B:
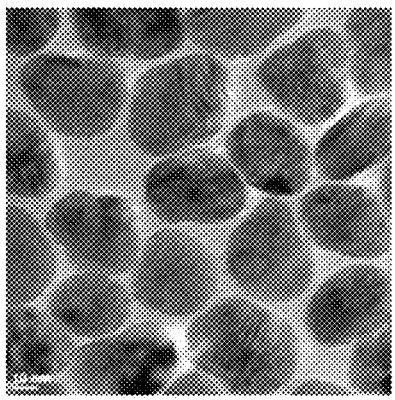
Figure 5C:
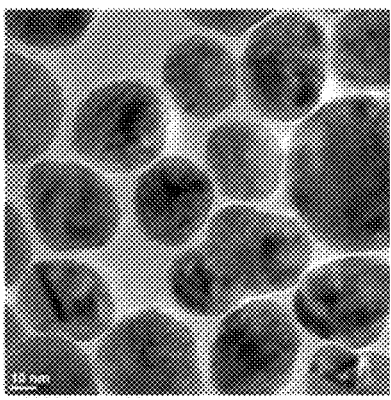
Figure 5D:
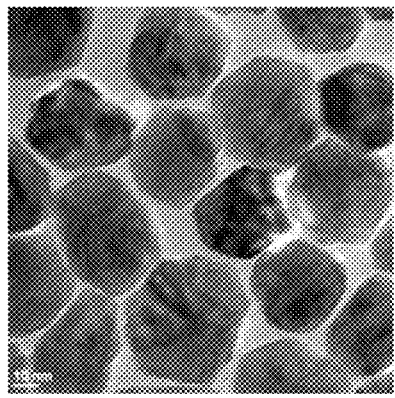
Figure 5E:
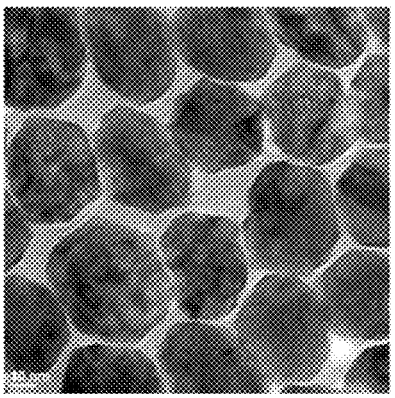
Figure 5F:
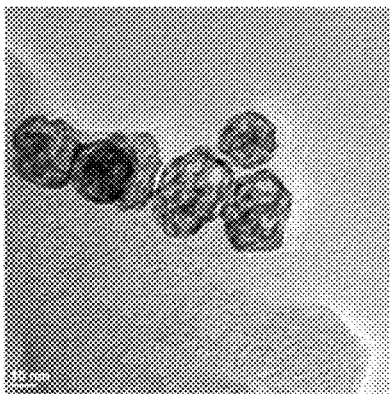

In one example, 20 nm PtNi nanoparticles were synthesized with segregated Pt and Ni distributions in a one-pot synthesis. Specifically, the segregated PtNi nanoparticles comprise Pt rich shells with Ni rich cores and Pt rich nuclei. As shown in FIG. 2A, the distribution of Pt and Ni rich phase are clearly shown in the EDX mapping. Together with the reaction time dependent particle size and composition evolution (FIG. 3), it is clear that as soon as the Pt rich nuclei formed in the beginning of the synthesis, Ni rich phase was developed quickly as Ni reduction is faster than Pt under the intentionally designed synthesis condition and when the nickel precursor is depleted, the growth of the particle is slowed down and Pt rich shells formed due to slow reduction of Pt precursor. Given the significant higher reduction potential of Pt compared with Ni (0.73V vs. −0.23V), the preferential reduction of Ni over Pt is very unusual and it is achieved here by fine tuning the reaction balance. These particles are uniformly loaded on carbon with newly developed loading process (FIG. 2B). As shown in FIG. 2C, PtNi nanocages were prepared by removing the Ni rich part of the particle with acetic acid. More importantly, this one-pot synthesis procedure is readily scalable. Shown in FIGS. 2D and 2E are TEM images of two batches of $Pt_1Ni_6$ nanoparticles synthesized at 6 times larger scale and loaded on carbon with above mentioned procedure. Each batch of synthesis produces $Pt_1Ni_6$ nanoparticles with uniform size of ~20 nm and they are dispersed on carbon uniformly. After removing Ni rich part of the particles, more than 0.6 g PtNi nanocages was made in each synthesis. As shown in FIGS. 2F and 2G, both of these two batches of synthesis show similar ORR activities (4.39 and 4.66 A/mg at 0.9V) which are slight higher than small batch synthesis and 12-13 times higher than commercial Pt/C catalyst (0.36 A/mg at 0.9V). These results are much higher than PtNi cage structures synthesized in aqua solution which can only achieve limited percentage of Ni in the structure.

Synthesis of 20 nm $Pt_1Ni_6$ Nanoparticles

In a 50 ml round bottom flask, 33 mg $Pt(acac)_2$, 167 mg $Ni(acac)_2$, 2 ml oleylamine, 0.8 ml oleic acid, 1.5 ml 1,2-dichlorobenzene, and 10 ml diphenyl ether were heated up to 110° C. under flow of Ar and magnetic stir of 400 rpm. After removing dissolved oxygen by holding temperature at 110° C. for 20 min, the mixture was heated up to 240° C. The synthesis was terminated by removing the heating mantle after 1 h of reaction at 240° C. After cooling to below 50° C., $Pt_1Ni_6$ nanoparticles with size of around 20 nm were collected by centrifuge at 8000 rpm and washed by hexane and ethanol.

A scale up synthesis was performed in a 125 ml round bottom flask and the synthesis procedure is similar with small scale synthesis except that the chemical used are 0.2 g $Pt(acac)_2$, 1 g $Ni(acac)_2$, 12 ml oleylamine, 4.8 ml oleic acid, 6 ml 1,2-dichlorobenzene and 60 ml diphenyl ether.

Loading of PtNi Nanoparticles on Carbon:

Proper amount of carbon was dispersed in either hexane or chloroform by sonication. PtNi nanoparticles dispersed in either hexane or chloroform was mixed with carbon dispersed in corresponding solvent and sonicated for 20 min. Carbon supported PtNi nanoparticles were precipitated from chloroform by adding same volume of hexane. The newly developed loading procedure works for different particle size and different carbons. The precipitated materials were collected by filtration and dried in vacuum oven at 80° C. overnight. The surfactants on the surface of PtNi nanoparticles were removed by annealing in a furnace at 185° C. for 20 hours in air.

Acid Leaching:

To make PtNi nanocage structure, 20 nm $Pt_1Ni_6$ nanoparticles were dispersed in hexane and mixed with acetic acid by magnetic stirring at 90° C. in a round bottom flask. PtNi nanocages were collected by filtration, cleaned with ethanol and hexane, and dried in a vacuum oven at 80° C. overnight.
Characterization:

All the electrochemistry testing were performed at room temperature in 0.1M $HClO_4$ electrolyte within a three-electrode configuration. The electrochemical cell and all its components were cleaned in concentrated $H_2SO_4/HNO_3$ and washed in boiling water (18.2MΩ) before each measurement. A commercially available Ag/AgCl electrode was connected to the electrochemical cell with a salt bridge and used as reference electrode. The potential of reference electrode was calibrated with hydrogen evolution/oxidation reaction in each experiment. Catalyst was loaded onto a glassy carbon rotating disk electrode and used as working electrode. Pt wire coil is counter electrode. Catalyst ink with concentration of 0.5 mg/ml was made before each measurement. Depending on the Pt mass loading of the catalyst, 15-25 µl of ink was loaded onto glassy carbon electrode. The exact loading of Pt on glassy carbon electrode was determined with ICP measurement from the same ink. Pt mass activity was obtained based on ICP measurement. A stable state of the electrode was achieved after 20 cyclic voltammetry (CV) cycling between 0.06 and 1V with 50 mV/s scan before the ORR was measured using a 20 mV/s CV scanning. Double layer capacitance under Ar purging was subtracted and electrolyte resistance was corrected by iR compensation. Pt electrochemical surface area (ECSA) specific activity was obtained by normalizing the current to ECSA from carbon monoxide stripping. Pt and Ni dissolution was monitored with a home-built in-situ ICP-MS and the experiment details can be found in our previous publication (ACS Catal. 2016, 6, 2536-2544).

PtNi nanoparticles and carbon supported catalysts were dispersed in solvents (either hexane or ethanol) by sonication and a drop of the suspension was loaded onto TEM grid for TEM measurements. Low resolution TEM images were obtained on JEM-2100F (200 kV) equipped with an EDX detector.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of synthesizing PtNi nanocage catalyst comprising the steps of:
    synthesizing Pt1Ni6 nanoparticles having a Pt shell and a Ni core by:
        mixing a nickel precursor, a surfactant, a platinum precursor, and a polar solvent at a temperature of at least 230° C. forming a Pt1Ni6 nanoparticle solution; and
    acid leaching the Pt1Ni6 nanoparticles by:
        mixing an acid with the Pt1Ni6 nanoparticle a temperature above 80° C. ;
        removing Ni from the nanoparticles to form nanocages; and
        collecting the nanocages.

2. The method of claim 1, wherein the nickel precursor is Nickel acetylacetonate and mixing of the nickel precursor, the surfactant, the platinum precursor, and the polar solvent proceeds for at least 30 minutes.

3. The method of claim 1 wherein the surfactant comprises oleic acid and oleylamine.

4. The method of claim 1 wherein the platinum precursor comprises Pt (II) acetylacetonate, and the polar solvent comprises 1,2, -dichlorobenzene.

5. The method of claim 4, wherein the polar solvent is selected from the group consisting of diphenyl ether, dibenzyl ether, and combinations thereof.

6. The method of claim 1, wherein prior to acid leaching, the Pt1Ni6 nanoparticles are loaded onto a substrate, wherein the substrate is carbon.

7. The method of claim 1, wherein the acid is acetic acid.

8. The method of claim 1, wherein prior to acid leaching the Pt1Ni6 nanoparticles are loaded onto a substrate.

9. The method of claim 1, further comprising annealing the nanocages, forming PtxNiy nanocages where x:y is between 1:2 and 3:1.

10. A method of synthesizing PtNi nanocage catalyst comprising the steps of:
synthesizing Pt1Ni6 nanoparticles having a Pt shell and a Ni core by:
mixing a nickel precursor, a surfactant, a platinum precursor, and a polar solvent to form a reaction solution, the ratio of nickel precursor to platinum precursor being 10:90 to 40:60;
holding the solution at a temperature of at least at a temperature of at least 110° C. to remove dissolved oxygen;
heating the solution to at least 230° C. for at least 30 minutes and forming a Pt1Ni6 nanoparticle solution; and
acid leaching the Pt1Ni6 nanoparticles by:
mixing an acid with the Pt1Ni6 nanoparticle solution at temperature above 80° C. ;
removing Ni from the nanoparticles to form nanocages; and
collecting the nanocages.

11. The method of claim 10, wherein the nickel precursor is Nickel acetylacetonate and mixing of the nickel precursor, the surfactant, the platinum precursor, and the polar solvent proceeds for at least 30 minutes.

12. The method of claim 10, wherein heating the solution to at least 230° C. comprises heating to between 230° C. and 245° C.

13. The method of claim 11, wherein the surfactant comprises oleic acid and oleylamine.

14. The method of 12, wherein the platinum precursor comprises Pt (II) acetylacetonate, and the polar solvent comprises 1,2,-dichlorobenzene.

15. The method of claim 13, wherein the polar solvent is selected from the group consisting of diphenyl ether, dibenzyl ether, and combinations thereof.

16. The method of claim 10, wherein prior to acid leaching, the Pt1Ni6 nanoparticles are loaded onto a substrate, wherein the substrate is carbon.

17. The method of claim 10, wherein the acid is acetic acid.

18. The method of claim 10, wherein prior to acid leaching the Pt1Ni6 nanoparticles are loaded onto a substrate.

19. The method of claim 10, further comprising annealing the nanocages, forming PtxNiy nanocages where x:y is between 1:2 and 3:1.

20. The method of claim 19, wherein the annealing is 180° C. and 300° C. and annealing time is between 1 h and 24 hours.

* * * * *